US005950540A

United States Patent [19]

Klein

[11] Patent Number: 5,950,540

[45] Date of Patent: Sep. 14, 1999

[54] SWINGABLE CONVEYOR DEVICE FOR PRINTING UNITS

[75] Inventor: Albert K. Klein, Stuttgart, Germany

[73] Assignee: LTG Luftechnische Gesellschaft mit beschrankter Haftung, Germany

[21] Appl. No.: 08/851,418

[22] Filed: May 5, 1997

[30] Foreign Application Priority Data

May 3, 1996 [DE] Germany ........................... 196 17 503

[51] Int. Cl.[6] ............................ B65G 21/12; B65G 19/22

[52] U.S. Cl. ......................... 101/232; 198/728; 198/861.5

[58] Field of Search ..................................... 101/232, 230, 101/183, 177; 198/861.5, 589, 592, 728

[56] References Cited

U.S. PATENT DOCUMENTS

| | | | |
|---|---|---|---|
| 3,204,557 | 9/1965 | Wolbert | 101/426 |
| 3,897,053 | 7/1975 | Guy | 271/238 |
| 4,062,532 | 12/1977 | Peter et al. | 271/6 |
| 4,176,601 | 12/1979 | Szarka | 101/115 |
| 4,669,715 | 6/1987 | Jeschke | 101/231 |
| 4,711,172 | 12/1987 | Capdebose | 101/152 |
| 5,289,773 | 3/1994 | Saito et al. | 101/415.1 |
| 5,431,388 | 7/1995 | Bridoux | 271/252 |

FOREIGN PATENT DOCUMENTS

| | | |
|---|---|---|
| 526677 | 2/1993 | European Pat. Off. . |
| 545862 | 6/1993 | European Pat. Off. . |
| 618260 | 4/1931 | Germany . |
| 703284 | 4/1939 | Germany . |
| 1237533 | 8/1965 | Germany . |
| 1267228 | 5/1966 | Germany . |
| 2336527 | 2/1974 | Germany . |
| 1118159 | 6/1968 | United Kingdom . |

OTHER PUBLICATIONS

English translation of p. 2, line 22 to p. 3, line 7 of DE 618260.

English translation of Abstract of EP 526677.

"Qualitatsanspruch im Blechdruck stark gestiegen: Trend zum Vierfarben–Raster–plus Schmuckfarbendruck", Deutscher Drucker, Bd. 28, Nr. 41, Nov. 5, 1992, pp. 36–37.

*Primary Examiner*—Edgar Burr
*Assistant Examiner*—Daniel J. Colilla
*Attorney, Agent, or Firm*—Ostrolenk, Faber, Gerb & Soffen, LLP

[57] ABSTRACT

A printing-material conveyor between two printing units of a printing machine. The conveyor has a displaceable section displaceable to one position for enabling access to the first printing unit or displaceable to another position for receiving printing material from the first printing unit. A transport device includes the displaceable section which is followed by a stationary section. An endless conveyor with push members extends over both sections. The displaceable section being swingable. A cover plate swingable along with the displaceable section moves to block access to the displaceable section when the latter is displaced to enable access to the first printing unit.

22 Claims, 5 Drawing Sheets

SWINGABLE CONVEYOR DEVICE FOR PRINTING UNITS

BACKGROUND OF THE INVENTION

The present invention relates to a printing-material conveyor device for printing units of printing machines, in particular tin-plate printing machines, in which the printing-material conveyor device is arranged behind a (first) printing unit, has a displaceable section for access to the first printing unit, has a delivery as well as a transport device, and feeds the printing material, preferably tin plates, to a further processing place, in particular a further (second) printing unit, the transport device having at least one endless conveyor with push members for the printing material.

A printing-material conveyor device of the aforementioned type is known and serves to feed printing material leaving the printing unit of the printing machine to a further processing point, in particular another printing unit of a multi-color printing machine. The printing-material conveyor device has an endless belt conveyor consisting of a plurality of belts extending parallel to and spaced from each other, it conveying the printing material out of the printing unit housing. Adjoining the said endless belt conveyor there is another, similarly developed endless belt conveyor which conveys the printing material to a higher level where it is transferred to a transport device which also has endless courses. These endless courses are aligned horizontally and lead to the adjoining further processing place, in particular to a further printing unit. At least one of the endless courses of the transport device is developed as an endless conveyor provided with push members. It preferably has two chains rotating parallel to and spaced from each other which have shark-fin-like push members for engagement behind the corresponding rear edge of the printing material. Printing material, for instance a tin plate, which leaves the (first) printing unit is thus fed by means of the two endless conveyors arranged one behind the other which form a so-called delivery, to the horizontally extending course of the transport device, in which connection the endless conveyors which have shark-fin-like push members of the endless conveyor having chains engage behind the rear edge of the tin plate and in this way feed the printing material to the following printing unit. During the course of this feeding process, the shark-fin-like members are overtaken by push rollers of an endless course of the transport device which take over the rear edge of the tin plate and feed the front edge of the plate to the feed guide stops of the printing cylinder of the following printing unit with somewhat increased speed. The push rollers, which are under spring tension, produce an accurate position of the front edge of the tin plate against the feed guide stops and after the application of the tin plate move down corresponding to the deflection region of the corresponding endless course. The transfer described of the plates from the shark-fin-like push members onto the push rollers is necessary in order to prevent the relatively far upward extending push members from damaging the rear edge of the plate upon the moving down. The endless belt conveyor of the known printing-material conveyor device leading to the transport device is preferably developed in two parts, that is it has a swing shaft between its two ends in such a manner that it can assume a V-shaped position—as seen from the operator's side—with the result that the end which in operating position faces the printing unit on the delivery side extends obliquely or vertically upwards so as to result in a position of release, i.e. a "lane" is formed in the printing-material conveyor path which permits access to the printing unit. Since, on the one hand, the endless conveyor which permits such access has a given structural length which is determined by the design and, on the other hand, the following transport device also cannot have less than a given structural length which determines in part the largest possible format of the printing material, this leads to a relatively large distance between the individual printing units of a multi-color printing machine. It there is concerned, for instance, a four-color printing machine to which tin plates are fed by means of a delivery from a stack and which is followed by a varnishing machine, there then results a total structural length of about 30 meters; in other words the known structural shape requires a correspondingly large space for installation.

SUMMARY OF THE INVENTION

The object of the present invention is therefore to create a printing-material conveyor device of the aforementioned type which is of shorter structural shape, whereby the overall length of a printing machine is reduced and therefore an installation space of smaller floor surface for the installation is sufficient.

This object is achieved in accordance with the invention in the manner that the displaceable section is part of the transport device. Due to this development in accordance with the invention, the said delivery-side access to the printing unit is taken over by a section of the transport device, this section being displaceable so that, in its position of release, it creates the aforementioned "lane" in the transport path. The endless conveyor provided with the preferably shark-fin-like push members extends into the displaceable section, in other words the structural length determined by the largest format is retained, in which connection a section of the structural length, however, permits the access, so that—as compared with the known structural shape—the endless belt conveyor which is swingable in V-shape can be dispensed with. Only the very short endless belt conveyor still arranged within the housing of the printing unit remains. To this extent, as a result of the development in accordance with the invention, the distance between the individual printing units is decreased, so that a reduction in length of about 4 meters is obtained in the case of said four-color printing machine. The numerical indication of this reduction in length of course constitutes merely an example; in other words, the value indicated is intended merely to explain the invention and not to limit it.

In accordance with a further development of the invention, it is provided that the transport device have a stationary section and the displaceable section, and that the endless conveyor provided with push members extends continuously over both sections.

It is advantageous for a first swing axis lying in the transition region between the two sections to be provided, around which the displaceable section is swingably mounted. In the operating position of the swingable section, there is obtained a continuous transport track for the printing material. In the swung position of release, access to the corresponding printing unit is assured.

In accordance with a preferred embodiment of the invention, the first axis of swing extends transversely, particularly at a right angle, to the direction of conveyance of the printing material. The first axis of swing extends, in particular, horizontally.

For the said delivery-side access to the first printing unit, the displaceable section is preferably swingable from its operating position around the first axis of swing downward into the position of release. This means that the end of the transport device directed toward the delivery of the printing unit is swung downward around the first axis of swing so that the section initially inclined slightly downward in the direction to the printing unit in the operating position is brought into a substantially more inclined, preferably approximately vertical position. In this way, the aforementioned "lane" is created.

The swinging of the displaceable section is effected preferably by means of a machine drive, in particular by means of at least one piston/cylinder unit.

In particular, it can be provided that, above the transport device, there is arranged a work stage which can be walked upon and which gives the operator access to the parts of the printing machine located higher up.

In particular, a first working platform of the working stage which is displaceable around a second axis of swing is arranged above the displaceable section of the transport device. This first work platform thus forms a section of the work stage which is associated with the first printing unit. In accordance with a preferred embodiment of the invention, a mechanical platform drive, in particular at least one further second piston/cylinder unit engages, on the one hand, on a stationary machine frame and, on the other hand, on the swingable first work platform for the swinging thereof. This swinging is effected by the setting up of the first end of the work platform, i.e. the free end is preferably swung approximately vertically upward. It is provided that the first work platform be connected with a cover element, in particular a cover plate, by at least one coupling member, for instance at least one connecting rod, the cover plate being mounted swingably on the machine frame by means of a third axis of swing. In the operating position of the swingable section of the transport device, and therefore during the printing, the cover element, which is preferably developed as a cover plate, is located below the displaceable section of the transport device, namely in the region of the, still closed, "lane". If access is to be created to the first printing unit, then the displaceable section of the transport device is swung downward by means of the machine drive, preferably by means of the first piston/cylinder unit. Thereupon, the machine platform drive is activated, it swinging the swingable first work platform upwards, in which connection the cover element, which is preferably developed as a cover plate, is also carried along by means of the coupling element, i.e. the cover plate also frees the "lane" which has been already formed on the basis of the swung-away displaceable section of the transport device. By the carrying along of the cover plate, the latter, due to its third axis of swing lying on the bottom side, passes into a preferably vertical or approximately vertical position (protective position) in which the displaceable section of the transport device which is also in position of release is screened from the access zone (lane). Thus an operator can enter the lane even though the transport device is still in operation, i.e. the endless courses are rotating. The cover element assumes in the protective position a screening function so that the operator is not endangered.

Furthermore, it is advantageous if the second axis of swing of the first work platform and the third axis of swing of the cover element are associated with the side of the displaceable section of the transport device which has the first axis of swing. This design has the result that the free end of the displaceable section of the transport device is swung away downward from the first printing unit and that the free end of the first work platform of the work stage is swung upward away from the printing unit, and that the free end of the cover element which faces in the direction toward the first printing unit during printing is displaced upward, away from the printing unit, into the protective position and therefore in its approximately vertical protective position, screens off the swung, displaceable section of the transport device.

It is advantageous, furthermore, for the free end of the displaceable section of the transport device which faces away from the first swing axis to be, in operating position, opposite the delivery of the printing unit, so that the tin plates which leave the printing unit are taken over preferably along a slightly ascending transport path.

In particular, it can be provided that the work stage have a second platform which is located above the stationary section of the transport device. In particular, the second platform can also be swingable, in which case the corresponding axis of swing lies on the side of the second platform facing away from the second printing unit so that the free end of the second platform, when it is swung up, moves away from the printing unit upward along a circular arc and thus assures access to the section of the transport device below it and also to the second printing unit on the feed side thereof.

Finally, it is advantageous for the work stage to bridge over the entire distance between the two printing units so that it is not necessary—as in the prior art—for each printing unit to have a corresponding working podium both on the inlet side and on the outlet side, but a correspondingly short work stage between the printing units in accordance with the invention is sufficient in order to obtain access, in each case, to the two adjoining printing units.

When in the course of this application, mention is made only of two printing units of the printing machine, this does not limit the object of the invention. If more than two printing units are present, then a printing material conveyor device developed in accordance with the invention is present between every two adjacent printing units.

Other features and advantages of the present invention will become apparent from the following description of the invention which refers to the accompanying drawings.

BRIEF DESCRIPTION OF THE DRAWINGS

The drawings show the invention on basis of an embodiment, as follows.

DETAILED DESCRIPTION OF THE INVENTION

Figure 1:
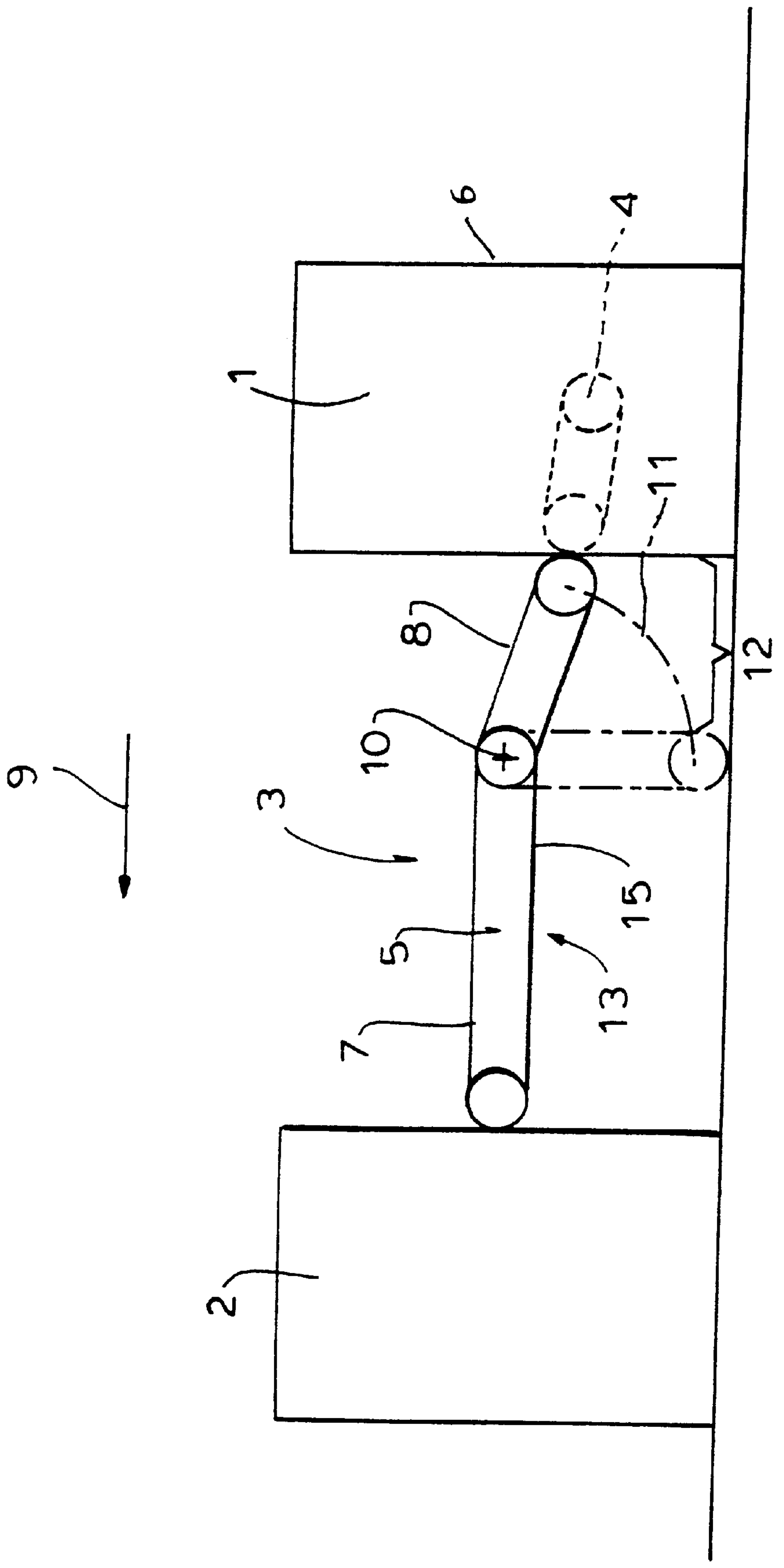
FIG. 1 is a diagrammatic side view of a printing-material conveyor device which is present between two printing units of a printing machine.

FIG. 1 shows a first printing unit 1 and a second printing unit 2 of a printing machine (not further shown) which is developed preferably as sheet-metal printing machine, i.e. the printing material to be printed is tin plate. The printing machine can—in addition to the said two printing units 1 and 2—also have further printing units, which however are not shown and also do not contribute anything further for an understanding of the invention. Between the two printing units 1 and 2 there is—as shown in FIG. 1—a printing-material conveyor device 3 which consists of a delivery 4 and a transport device 5. The delivery 4 is located in the housing 6 of the first printing unit 1. The tin plates leaving the first printing unit 1 are transported from the delivery 4 to the transport device 5 which takes them over and feeds them on the entrance side to the second printing unit 2. The transport device 5 has a stationary, preferably horizontally extending section 7 and a displaceable section 8, in which connection—seen in printing direction (arrow 9) and therefore from the printing unit 1 to the printing 2—the free end of the displaceable section 8 of the transport device 5 which faces the printing unit 1 adjoins the delivery 4, in which connection the displaceable section 8 during its transport movement moves the tin plates along an ascending path of movement to a higher level at which the stationary section 7 of the transport device 5 is located. When the tin plates reach this higher level, they are moved by means of the stationary and therefore non-swingable section 7 of the transport device 5 in the direction towards the second printing unit 2 and finally moved on the entrance side to the second printing unit 2 and finally transferred on the entrance side to the second printing unit 2.

In FIG. 1, the displaceable section 8 of the transport device 5 is shown—in solid line—in its operating position which it assumes during the printing of the printing machine. By dash-dot line in FIG. 1, it is indicated that the displaceable section 8 can be swung around a first axis of swing 10—along the arc 11—into a position of release. In this position of release there is opened up between the horizontally extending, stationary section 7 of the transport device 5 and the outlet side of the printing unit 1, a lane 12 which provides an operator with access to the outlet side of the printing unit 1. The transport device 5 has several endless courses 13 which will be described in further detail below, in particular in FIGS. 4 and 5. At this point, it may merely be mentioned than an endless conveyor 15 provided with push members 14 extends continuously over both sections of the transport device 5, namely both over the horizontally extending section 7 and over the displaceably developed section 8. This can be noted more clearly from FIG. 2, in which the endless conveyor 15 is shown in dashed line. The two sections 7 and 8 have, in their transition region, the first axis of swing 10 around which the displaceable section 8 can be displaced from its position opposite the delivery 4 into a position directed downward and in particular in a position directed vertically downward. In order in this connection to avoid having the endless conveyor 15 "sag through" upon the swinging into the release position, at least one support wheel 16 is provided which rests—from below—against the lower course of the endless conveyor 15. The axis of rotation of the support wheel 16 is advisedly arranged—as shown in FIG. 2—below the first axis of swing 10, shifted towards the printing unit 1.

Figure 2:
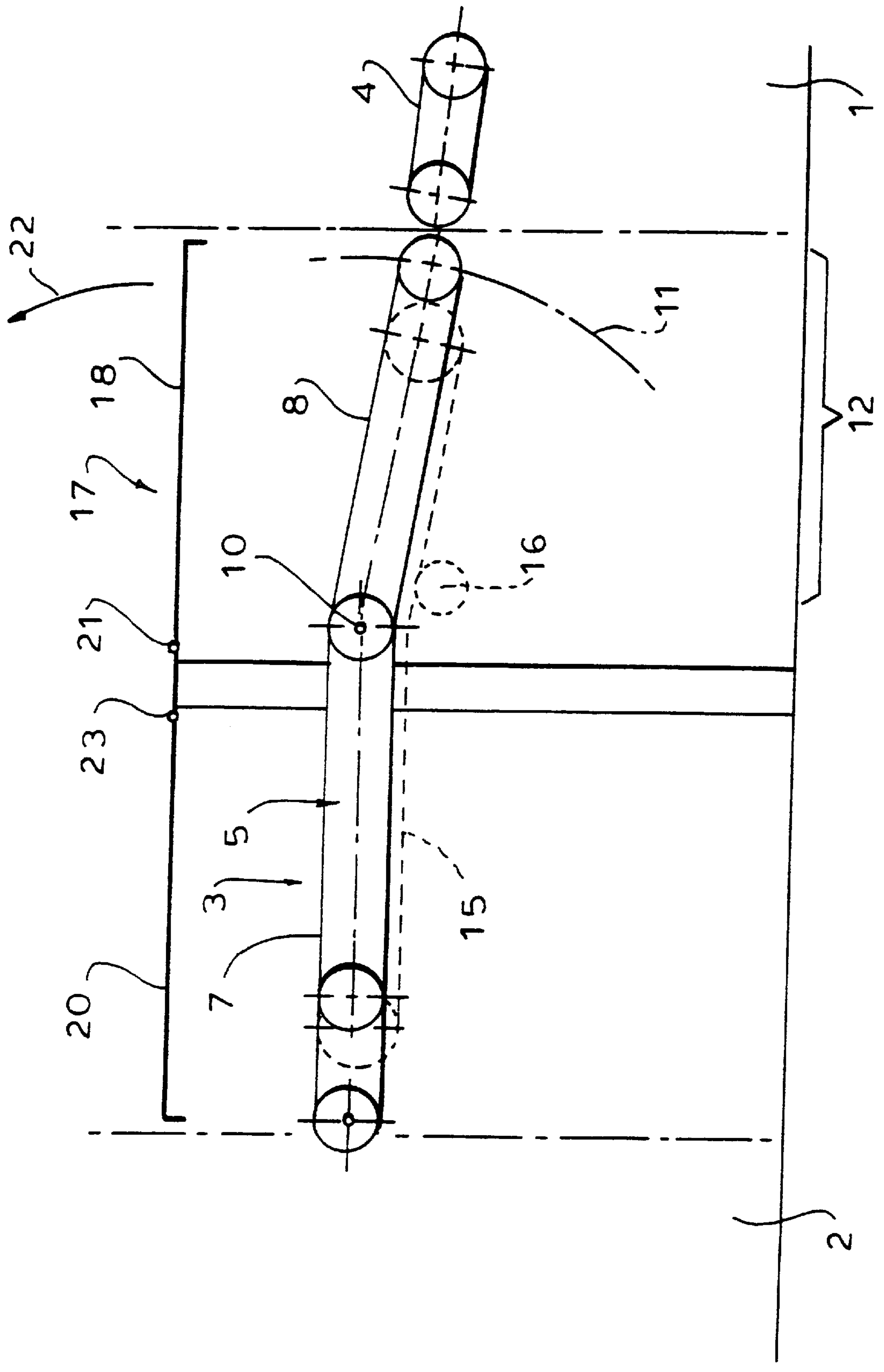
FIG. 2 is a detailed, enlarged showing corresponding to FIG. 1.

FIG. 2 furthermore indicates diagrammatically that above the printing-material conveyor device 3 there is a work stage 17, which can be entered on by the operator by suitable stairs or the like (not shown) and gives access to both printing units 1 and 2 since the work stage 17 bridges over the entire distance between the two printing units 1 and 2. The work stage 17 has a first work platform 18, which is associated with the printing unit 1. A short stationary section 19 of the work stage 17 adjoins the first work platform 18 and is followed by a second work platform 20 which is associated with the second printing unit 2. By means of a second axis of swing 21, which is associated with the remaining section 19 located approximately centrally between the printing units 1 and 2, the first work platform 18 can be swung in the direction indicated by the arrow 22. This swinging motion can be effected into a vertical or approximately vertical position as a result of which the lane 12, already shown in FIG. 1, is freed, i.e. full access to the printing unit 1 is provided also in the region of the work stage 17. The second work platform 20 is also swingable. For this purpose, it is swingable upward around an axis of swing 23 associated with the stationary section 19, so that access is provided from above to the stationary section 7 of the transport device 5. The open position of the second work platform 20 is fixed by a gas pressure spring (not shown).

Figure 3:
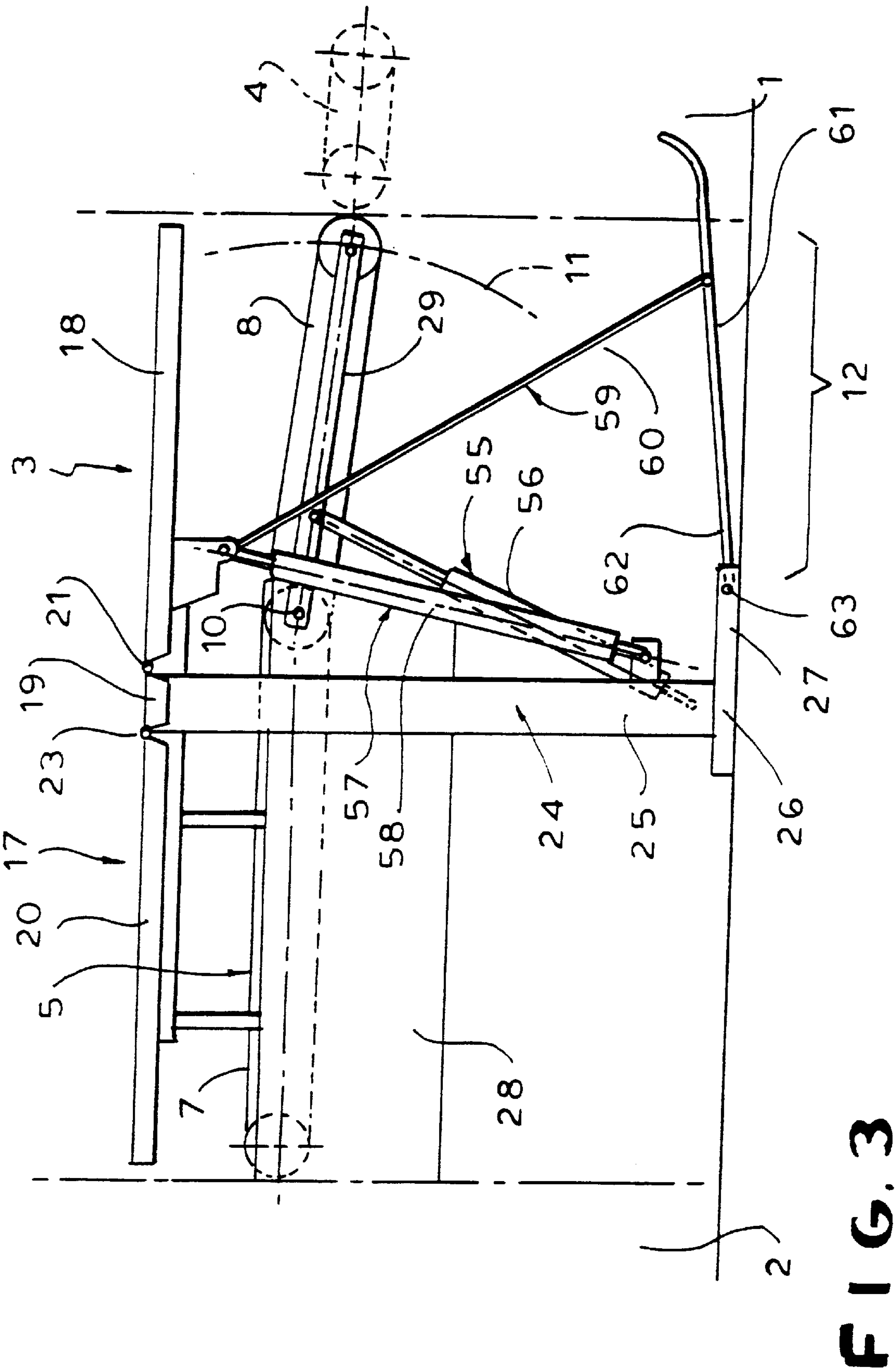
FIG. 3 is a showing corresponding to FIG. 2 which, however, in addition shows structural elements diagrammatically.

FIG. 3 shows a machine frame 24, which has a vertically extending girder 25 on both sides of the transport path formed by the printing-material conveyor device 5, the girder bearing at its upper end the stationary section 19 of the work stage 17. At the lower end of the corresponding girder 25 there is arranged a foot 26 the end region 27 of which extends in the direction towards the printing unit 1. On each girder 25 there is fastened a transverse girder 28 on which the horizontally extending section 7 of the transport device 5 is fastened. Furthermore, the axis of rotation 10 is formed on the transverse girder 28, i.e., between the two transverse girders 28 which are arranged opposite and spaced from each other, the displaceable section 18 of the transport device 5 is mounted for swinging along the circular arc 11 which can be noted from FIGS. 1 and 2. For this purpose, a corresponding frame 29 of the displaceable section 8 is guided—swingable about the axis of rotation 10—between the said transverse girders 28.

Figure 4:
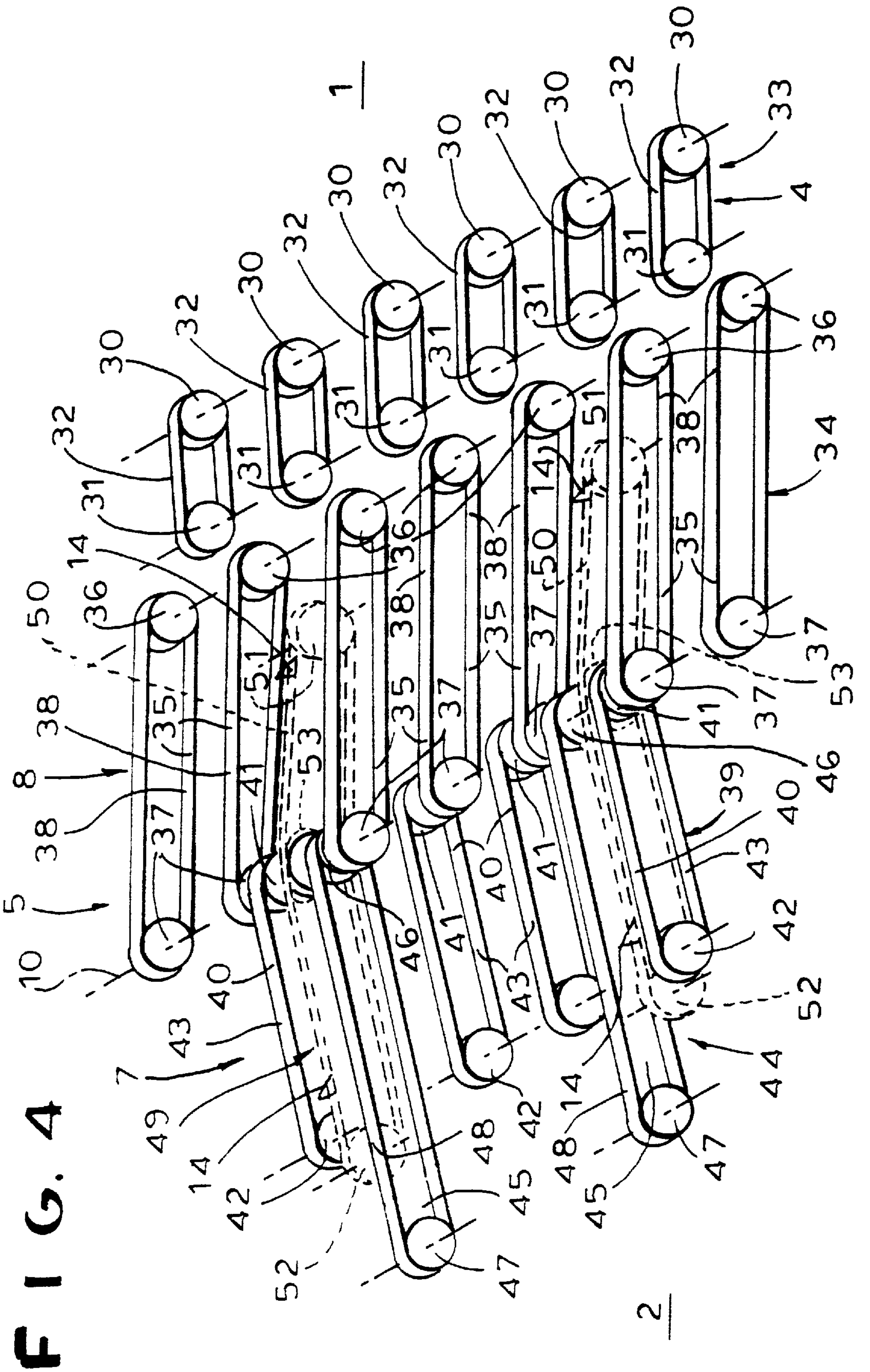
FIG. 4 is a diagrammatic, perspective view of the different endless below conveyors and endless belt courses of the printing-material conveyor device.

FIG. 4 makes it clear that the individual endless belt conveyors or endless courses of the delivery 4 and transport device 5 do not consist of wide continuous belts or the like but that in all cases several narrow belts which extend parallel to and spaced from each other or the like are provided. Specifically, the delivery 4 consists of six belt courses extending parallel to each other, each of which has a guide wheel 30 facing the printing unit 1 and a guide wheel 31 facing away from the printing unit 1. The two guide wheels 30 and 31 are wrapped by belt loops 32, so that an endless belt conveyor 33 is formed in this manner. The endless belt conveyor 33 is driven by a drive, not shown, preferably by means of the drive of the printing unit 1.

The transport device 5 has—as shown in FIG. 4—in the region of the displaceable section 8 a first endless course 34 which is formed by seven individual belt conveyors 35 extending parallel to and spaced from each other. Each individual belt conveyor 35 has a guide wheel 36 which lies a slight distance away facing the guide wheel 37 of the delivery 4 on a "gap". Furthermore, guide wheels 37 are provided, one guide wheel 36 and one guide wheel 37 each being wrapped around by a belt 38. The guide wheels 37 are mounted for rotation around the aforementioned axis of swing 10.

The stationary section 7 of the transport device 5 has an endless course 39 which consists of four individual-belt conveyors extending parallel to and spaced from each other. Each individual-belt conveyor 40 has a guide wheel 41 which is mounted for rotation around the first axis of rotation 10. Furthermore, guide wheels 42 are provided, in each case a guide wheel 41 and a guide wheel 42 being wrapped around by a belt loop 43.

Furthermore, the stationary, horizontally extending section 7 of the transport device 5 has, associated with it, an endless course 44 which consists of two individual belt conveyors 45 which extend up to the adjoining printing unit 2 and are therefore longer that the individual belt conveyors 40. Each individual belt conveyor 45 has a guide wheel 46 which is mounted for rotation around the first axis of swing 10. Furthermore, guide wheels 47 are provided, a belt loop 48 being guided in each case around a guide wheel 46 and a guide wheel 47.

Finally, the transport device 5 has associated with it an endless conveyor 49 which has two parallel spaced chain courses 50. Each chain course 50 has a guide wheel 51 which is present in the displaceable section 8 and a guide wheel 52 which is present in the stationary section 7. Furthermore, each of the two chain courses 50 is guided over a guide wheel 53 which lies approximately in the center and which is mounted for rotation around the first axis of swing 10. Furthermore, the corresponding chain course 50 is supported from below by a support wheel 16, not shown in FIG. 4 but mentioned in the description of FIG. 2.

Figure 5:
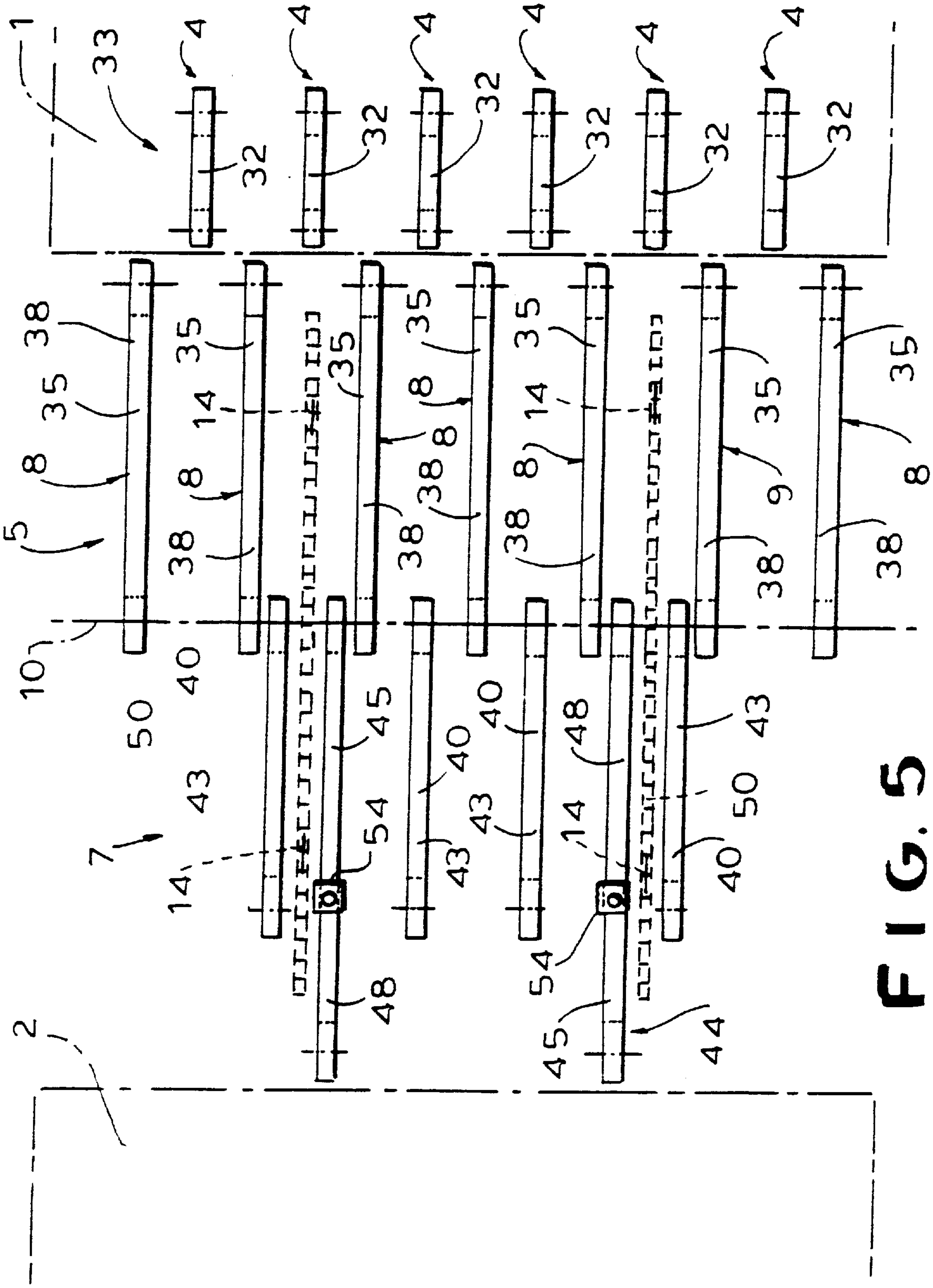
FIG. 5 is a top view on the printing-material conveyor device of FIG. 4.

FIGS. 4 and 5 show that the chain course 50 of the endless conveyor 49 is provided with the aforementioned push members 14 which engage behind the rear edge of the tin plate which is to be conveyed and in this way push the tin plates forward in well-defined position and thus move in the direction towards the printing unit 2. In the course of this movement, the endless course 44 overtakes the endless conveyor 49, i.e. push rollers 54 of the endless course 44 overtake the shark-fin-like push members 14 of the endless conveyor 49, as a result of which the rear edge of the corresponding tin plate is turned over to the push rollers so that the push members 14 can move down without danger in the deflection region and do not damage the corresponding rear edge of the plate.

From FIGS. 4 and 5 it can be noted that the axis of rotation of the guide wheels 51 is staggered with respect to the axis of rotation of the guide wheels 36 in the direction towards the printing unit 2. Furthermore, it can be seen that the axis of rotation of the guide wheels 42 is spaced from the printing unit 2. The axes of rotation of the guide wheels 52 are at a smaller distance from the printing unit 2 and the axes of rotation of the guide wheels 47 are closest to the printing unit 2, so that the end of the endless course 44 is directly opposite. Furthermore, it can be seen that the individual-belt conveyors 40 of the endless course 38 lie—as seen from the drive side or the operator's side of the printing machine—between the second and third or third and fourth endless-belt conveyors 35 of the first endless course 34. Between the first and second individual-belt conveyors 40 of the endless course 39 there are the individual belt conveyors 45 of the endless course 44 and the chain courses 50 of the endless conveyor 49.

Referring back to FIG. 3, it can be noted that there is associated with the displaceable section 8 of the transport device 5, a machine drive 55 which is formed of, in each case, two piston/cylinder units 56 which on the one hand are swingable on the girder 25 and on the other hand are swingable on the frame 29. Furthermore, a machine platform drive is provided which also consists of two piston/cylinder units 58. Each piston/cylinder unit 58 is swingable on the machine frame 24, namely on the girder 25, and also swingably connected to the first work platform 18. Furthermore, coupling elements 59 are provided which are developed as connecting rods 60. Each connecting rod 60 has one end swingably connected to the first work platform 10 and the other end in each case swingably connected to a cover element 61. The cover element 61 is developed as cover plate 62, which is mounted by a third axis of swing 63 on the end region 27 of the foot 26. In the horizontally extending and therefore closed position of the first work platform 18 shown in FIG. 3, the cover plate 62 extends—starting from its third axis of swing 62—slightly obliquely upwards in the direction towards the printing unit 1.

The following manner of operation results:

If an operator wishes access to the outlet side of the printing unit 1—for example, for purposes of maintenance or due to a jammed tin plate—and therefore wants to enter into the lane 12, the displaceable section 8 of the transport device 5 is first of all, by inward movement of the piston/cylinder units 56, displaced around the first axis of swing along the circular arc 11 so that this section 8 points approximately vertically downward. Thereupon the piston/cylinder units 58 are moved outward so that the first work platform 12 is displaced upward around its second axis of swing 21, as a result of which, due to being carried along by the connecting rod 60, the cover plate 62 is carried along, that is, is swung around the third axis of swing 65. In this way, the first work platform 18 on the one hand frees the lane 12 and furthermore the cover plate 62 is erected and thus screens the downward displaced section 8 of the transport device 5. It is therefore not necessary to shut off the transport device 5 in this position, but it can continue in operation. If the printing is to be resumed again, the original state is restored in the corresponding sequence.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A printing material conveyor for conveying printable printing material between separated first and second printing units of a printing machine, the conveyor comprising:

a transport device for feeding printing material from the first to the second printing units;

a delivery device at the first printing unit for delivering printing material to the transport device;

the transport device including:

a displaceable section displaceable between a position where the displaceable section may receive printing material from the delivery device and a position where the displaceable section provides access to the first printing unit without interference from the displaceable section;

a stationary non-displaceable section following the displaceable section along the path of the printing material; and a push conveyor including push members for pushing the printing material toward the second printing unit, the push conveyor extending continuously over the displaceable and non-displaceable sections.

2. The conveyor of claim 1, wherein the push conveyor is an endless conveyor.

3. The conveyor of claim 1, further comprising a transfer region between the displaceable and the non-displaceable sections and the displaceable section has a swing axis at the transfer region about which the displaceable section swings between its positions.

4. The conveyor of claim 3, further comprising a work stage above the transport device.

5. The conveyor of claim 4, wherein the work stage includes a work platform and a second swing axis located above the displaceable section for supporting the work platform to swing between a work position above the displaceable section and a position permitting access past the work stage to the first printing unit.

6. The conveyor of claim 5, further comprising a work platform drive for displacing the work platform between the positions thereof.

7. The conveyor of claim 5, further comprising a cover element supported to the transport device at a third swing axis for being swingable between a position screening the displaceable section when the displaceable section is displaced away from the delivery device and a position out of the way of the displaceable section when the displaceable section is displaced to the delivery device.

8. The conveyor of claim 7, further comprising a coupling element between the work platform and the cover element so that they are displaceable together to their positions and enabling access to the first printing unit.

9. The conveyor of claim 8, further comprising a work platform drive for displacing the work platform between the positions thereof.

10. The conveyor of claim 9, wherein the work platform drive comprises a piston cylinder unit connected between the work platform and a stationary portion of the transport device.

11. The conveyor of claim 5, wherein the work stage includes a second work platform disposed over the stationary section of the transport device.

12. The conveyor of claim 11, wherein the work stage extends over and bridges over the entire space between the first and second printing units.

13. The conveyor of claim 7, wherein the second axis of the work platform and the third axis of the cover element are generally toward the side of the displaceable section having the respective swing axis and are generally at the transfer region; whereby the work platform, the cover element and the displaceable section all are displaced around their axes away from the first printing unit.

14. The conveyor of claim 8, wherein the work platform and the second axis are above the displaceable section while the cover element and the third axis are below the displaceable section when the displaceable section is at the delivery device, and the work platform and the cover element are both displaced upward around the respective second and third axes to provide access to the first printing unit.

15. The conveyor of claim 14, wherein the cover element in its upwardly displaced position screens the displaceable section from a zone permitting access to the first printing unit.

16. The conveyor of claim 8, wherein the cover element is so positioned that with the displaceable section away from the first printing unit, the cover element is in position to screen the displaceable section from a zone of access to the first printing unit.

17. The conveyor of claim 3, wherein the swing axis extends transversely to the direction of conveyance of the printing material past the swing axis.

18. The conveyor of claim 17, wherein the swing axis extends horizontally.

19. The conveyor of claim 18, wherein the displaceable section is displaced to a downward position providing access to the delivery side of the first printing unit.

20. The conveyor of claim 17 further comprising a machine drive for displacing the displaceable section between its positions.

21. The conveyor of claim 20, wherein the machine drive comprises a piston cylinder unit connected to displace the displaceable section.

22. The conveyor of claim 3, wherein the displaceable section has a free end opposite the swing axis thereof and in one displacement position, the free end is at the delivery unit.

* * * * *